Sept. 6, 1938.     D. E. GAMBLE     2,129,372
CLUTCH PLATE
Filed Feb. 15, 1935
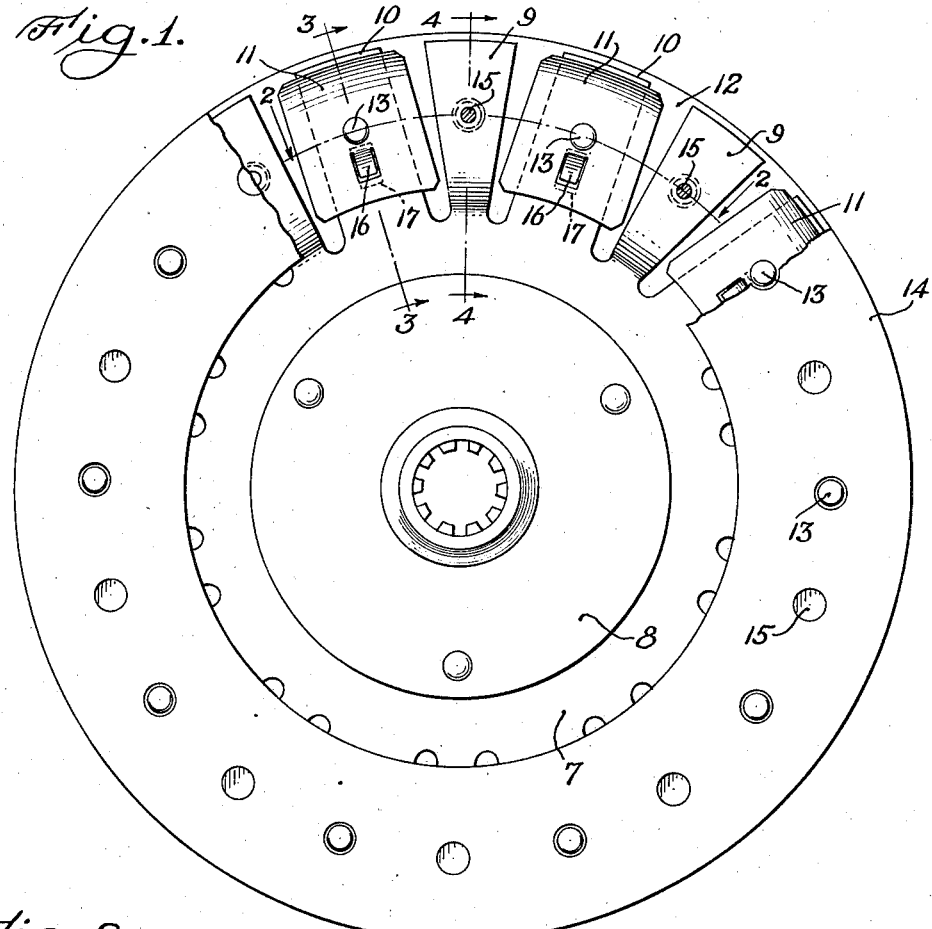
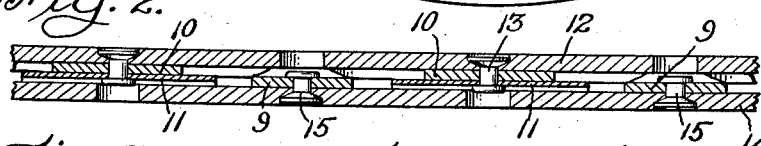
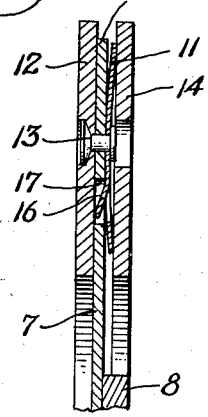 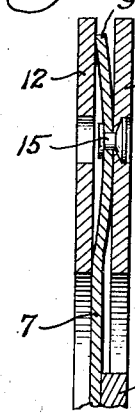 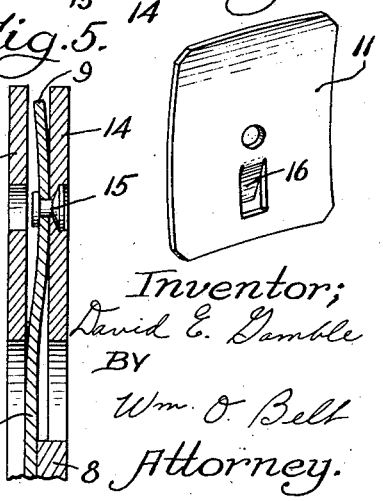
Inventor;
David E. Gamble
BY
Wm. O. Belt
Attorney.

Patented Sept. 6, 1938

2,129,372

UNITED STATES PATENT OFFICE 2,129,372

CLUTCH PLATE

David E. Gamble, Chicago, Ill., assignor to Borg-Warner Corporation, Chicago, Ill., a corporation of Illinois Application February 15, 1935, Serial No. 6,624

9 Claims. (Cl. 192—107)

This invention relates to friction clutches for automotive vehicles and it may also be used in other friction clutches for which it is or may be adapted.

The primary object of this invention is to provide a novel clutch plate with a wide distribution of points of support for the friction facings which are adapted for cushioned engagement in the operation of the clutch.

Another object is to prevent movement of the separate cushion members of a cushioned clutch plate about the mountings therefor.

A further object is to provide a cushioned clutch plate having at least one friction facing thereon spaced from the disc wherein the spacing of the facing is provided by means which also cushion the facing in addition to separate cushion members provided for this purpose.

A still further object is to provide a cushioned clutch plate having a friction facing spaced from the disc by means which also cushion the facing in addition to separate cushion members provided for this purpose wherein the plate is cushioned in stages during engagement thereof in operation of the clutch.

In the accompanying drawing illustrating the invention:

Fig. 1 is a plan view of the clutch plate showing one facing partly broken away;

Fig. 2 is a sectional view on the line 2—2 of Fig. 1;

Fig. 3 is a sectional view on the line 3—3 of Fig. 1;

Fig. 4 is a sectional view on the line 4—4 of Fig. 1;

Fig. 5 is a sectional view similar to Fig. 4 showing another form of the invention; and Fig. 6 is a perspective view of one of the separate cushion members shown in Fig. 1.

Referring to the drawing, the clutch plate selected for illustration comprises a disc 7 secured to a hub member 8 which is adapted to be mounted on a driven shaft of an automotive vehicle. The disc is slotted through its periphery to form tongues 9 and supports 10 in alternating arrangement. Cushion members 11, preferably made of a high grade spring steel, are arranged on the supports on one side of the disc and a friction facing 12 is arranged on the opposite side of the disc and the cushion members and facing 12 are fastened to the disc by rivets 13. The cushion members are curved to normally dispose the inner and outer ends thereof in spaced relation to the supports and the central portions of the cushion members are in engagement with the supports and fastened thereto by the rivets 13. I prefer to employ a cylindrical curvature for the cushion members 11, see Fig. 6, and to position the cushion members upon the disk, so that the axes of curvature are so arranged relative to the disc and the facings that the contacting areas between the cushions, the face and the disc increase radially relative to the disc as the plate is compressed during engagement of the clutch. The tongues 9 are curved to dispose the base and free end of each tongue in engagement with the facing 12 and the central portions of the tongues are spaced from the plane of the disc. A friction facing 14 is fastened to the central portions of the tongues by rivets 15 so that the facing 14 is in engagement with the inner and outer ends of the cushion members 11 and is spaced from the plane of the disc. The cushion members are provided with lips 16 struck from the cushion members and bent from the convex side thereof to engage the supports 10 in openings 17 therein provided. The lips 16 and openings 17 cooperate with the rivets 13 to prevent rotative movement of the cushion members about the rivets.

My invention provides a highly efficient cushion clutch plate wherein the facings are mounted parallel to each other and to the plane of the plate and remain so throughout engagement of the clutch plate in operation of the clutch. The cushion members may be made of a higher grade of material than is required in the disc. The cushion members are rigidly held in operative position between the facings and are positively held against rotative movement about the mounting therefor. The tongues are flexible because of their narrow cross-section at the base and provide an efficient additional cushion to the cushion members as well as a means for mounting the spaced friction facings on the clutch plate. The facing 12 is engaged with the support throughout one entire face of each support and with the base and free end of each tongue in the embodiment shown in Figs. 1–4. The curvature of the cushions 11 and the disposition of the axis of curvature relative to the disc and to the facing 14, is such that when the plate is uncompressed, there are two approximately parallel lines of contact between the facing and each cushion, and one line of contact between the disc and each of the cushions. As the clutch plate is compressed, however, these lines of contact broaden in directions radial of the disc hub to increase the area of contact and support. This simple arrangement provides for the maintenance of uniform yielding facing support circumferentially of the plate throughout the entire range of clutch plate operation, a feature that is highly desirable in the promotion of long life through uniform spacing wear.

The provision of structurally independent cushion members of a high-grade spring steel, permits the manufacturer to predetermine the exact resistance to compression of the clutch plate assembly during manufacture without alteration or change in the structure or thickness of the clutch disc 7, and therefore, without impairing the torque transmitting characteristics of the plate.

The tongues 9 may be curved, Fig. 5, so that only the base of each tongue is in engagement with the facing 12, and the free end of each tongue is bent back but not into the plane of the disc and remains on the side thereof toward which each tongue is bent at its base. This construction provides for a cushion which acts in stages. The first stage of cushioning in engagement of the clutch constitutes the partial straightening of the curve in the cushion members 11 and the curve in each tongue between the base and rivet until the free end of each tongue engages the facing 12 at which time the second stage of cushioning commences and constitutes the further straightening of the cushion members 11 and the further straightening of each tongue between the base and rivet plus the straightening between the rivet and the free end of each tongue. The second stage of cushioning continues until the cushion members 11 are completely straightened and the tongues 9 nearly so.

The facing 14 is supported by the central portion of each tongue and by the inner and outer edges of the cushion members. This provides a wide distribution of points of support for each of the facings so that the clutch plate has a high degree of efficiency.

While I have shown and described the invention in a particular type of clutch plate I do not mean thereby to restrict the invention to the embodiments illustrated nor to the type of clutch plate shown for it can be employed in many different embodiments and kinds of clutches and clutch plates with satisfactory results; and therefore I reserve the right to use the invention in any form and for any purpose for which it is or may be adapted within the scope of the following claims:

I claim:

1. A clutch plate comprising a relatively thick metal disc, spaced supports and tongues arranged in alternating succession at the periphery of the disc, relatively thin metal cushion members mounted on the supports, the cushion members and tongues being curved to offset parts thereof from the same side of the disc, and a friction facing arranged on the cushion members and tongues to cushion the engagement thereof during operation of the clutch.

2. A clutch plate comprising a disc, spaced supports and tongues arranged in alternating succession at the periphery of the disc, curved cushion members on one side of the supports with the central portion of their convex sides in engagement with the supports, the tongues being curved in a direction opposite to the curvature of said cushion members and arranged with the central portions thereof spaced from the plane of the disc, and a friction facing arranged on the ends of the cushion members and central portion of the tongues to cushion the engagement thereof during operation of the clutch.

3. A clutch plate comprising a disc, spaced supports and tongues arranged in alternating succession at the periphery of the disc, cushion members mounted on the supports, the cushion members and tongues being curved to offset parts thereof from the same side of the disc, friction facings arranged on opposite sides of the disc, means fastening one facing and the cushion members to the supports and on opposite sides thereof, and means fastening the other facing to the offset parts of the tongues to cushion the engagement thereof during operation of the clutch.

4. A clutch plate comprising a disc, spaced supports and tongues arranged in alternating succession at the periphery of the disc, curved cushion members arranged on one side of the supports, the tongues being bent from the plane of the disc on the side thereof having the cushion members thereon, and friction facings arranged on opposite sides of the disc and one facing spaced therefrom by the tongues and cushioned by the tongues and cushion members in engagement of the clutch plate during operation of the clutch.

5. A clutch plate comprising a disc, friction facings arranged on opposite sides of the disc, curved cushion members on the disc and between the facings, means fastening the cushion members to the disc to dispose the central portion of the convex side in engagement with the disc, and means on the cushion members engaging the disc to retain the cushion members in position, said means including portions of the cushion members extending outwardly therefrom in the direction of the disc and engageable with the disc at a point spaced away from said fastening means.

6. A clutch plate comprising a disc having openings therein, friction facings arranged on opposite sides of the disc, curved cushion members on the disc and between the facings, means fastening the cushion members to the disc to dispose the central portion of the convex side in engagement with the disc, and a lip struck from the convex side of each cushion member and extending into an opening in the disc to engage the disc for holding the cushion member against movement about the fastening means.

7. A clutch plate comprising a disc, supports and tongues arranged in alternating succession at the periphery of the disc, curved cushion members mounted on the supports, and friction facings on opposite sides of the disc, one facing being in engagement with the supports and the other facing in engagement with the ends of the curved cushion members, the tongues being curved to offset the central portion on one side of the plane of the disc and in engagement with said other facing and the free end thereof being curved back toward the plane of the disc but not thereinto to provide a cushion which acts in stages during engagement of the clutch plate during operation of the clutch.

8. A clutch plate comprising a disc, friction facings arranged one at each side of said disc, a plurality of curved cushion members in annular array about the peripheral region of the disc, means securing the cushion members to said disc with their free ends extending toward and contacting with the adjacent facing, the curvature of said cushion members being cylindrical and each generated about an axis that is so disposed that when the cushions are compressed the contacting area between the cushions and the adjacent facing surface increases in a radial direction, and means forming a part of the cushion members and engageable with the disc for restraining the cushion members against rotation about the axis of their securing means.

9. A clutch plate comprising a relatively heavy sheet metal disc, relatively rigid friction facings arranged one on each side of said disc at the peripheral portion thereof, and a plurality of structurally independent and relatively light cushion members arranged about said peripheral portion of said disc, means fixing each of said cushion members securely to said disc, said cushion members having portions extending away from said disc in the direction of the adjacent facing and adapted to contact the inner surface of the facing, each of said cushion members being so formed that when compressed, as by movement of the adjacent facing relatively toward the cushion, the area of contact between the cushion and facing will increase in a direction radially of the axis of the facing and disc.

DAVID E. GAMBLE.